United States Patent Office 3,515,985
Patented June 2, 1970

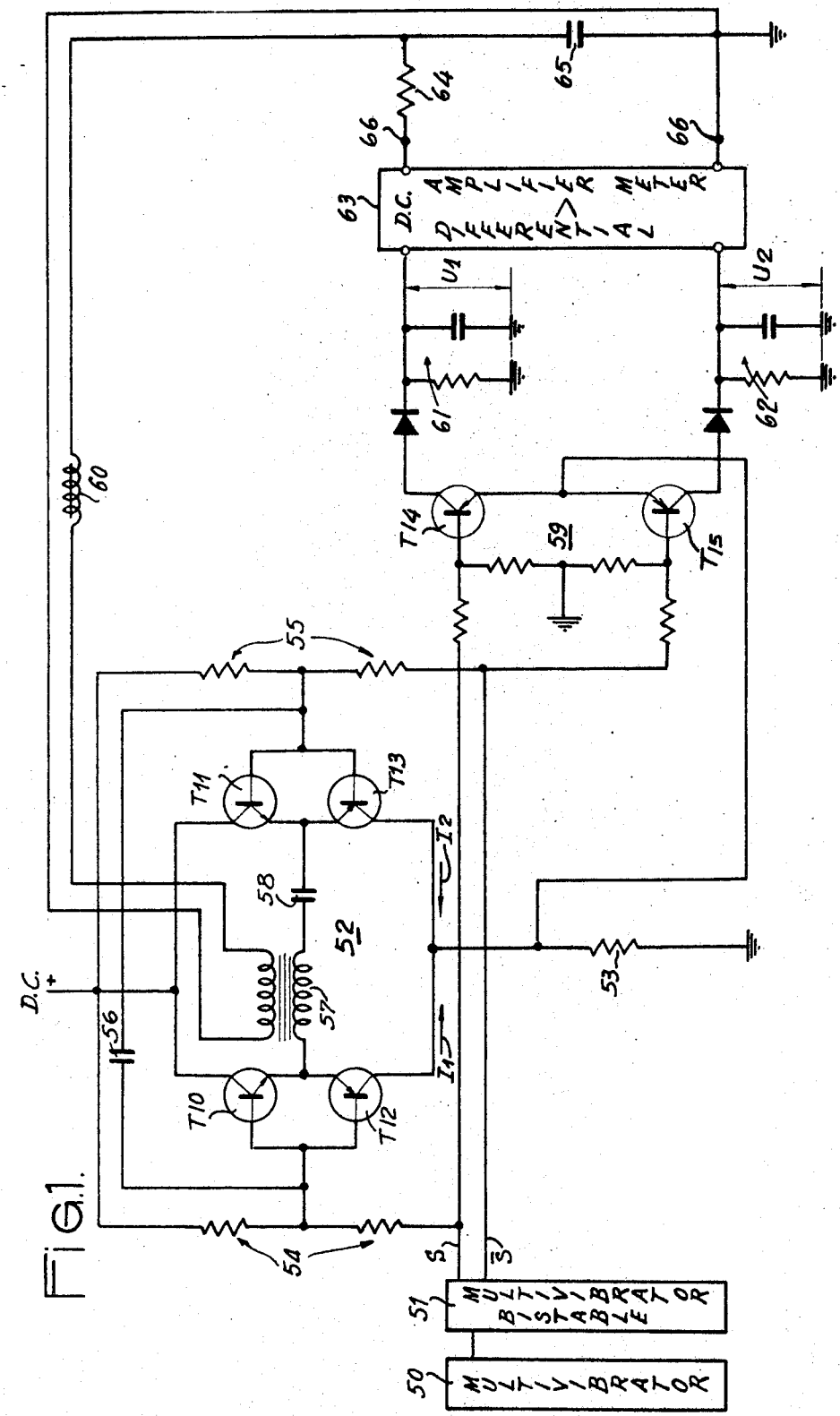

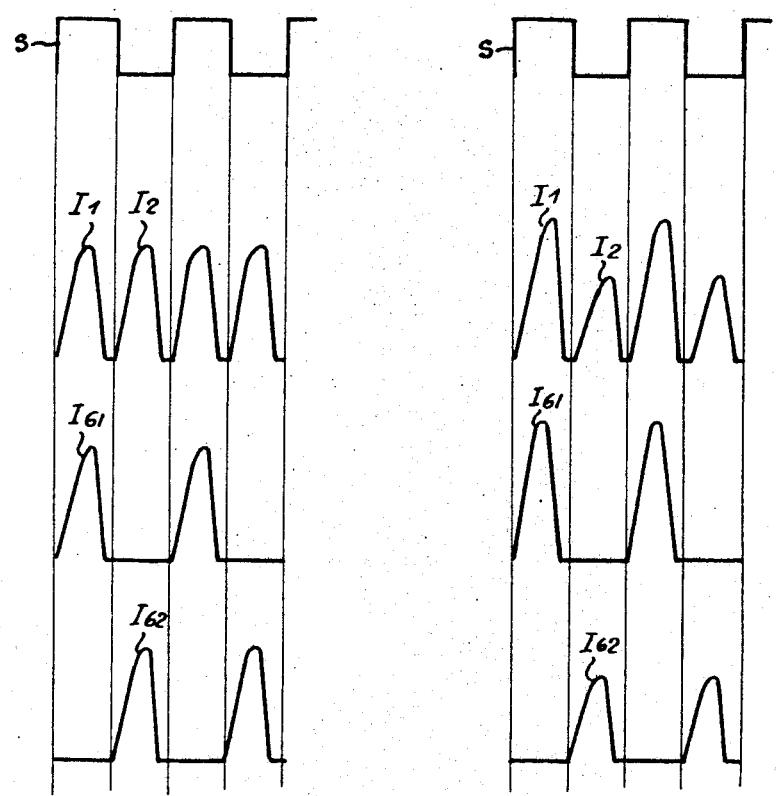

3,515,985
MAGNETOMETER INCORPORATING PROBE IN THE FORM OF A SATURABLE FERROMAGNETIC CORE SUBJECTED TO THE MAGNETIC FIELD TO BE MEASURED AND TO AN AUXILIARY EXCITING ALTERNATING FIELD
Germain Joseph Edmond Guillemin, Bagneux, France, assignor to Compagnie des Compteurs, Paris, France, a company of France
Filed Nov. 30, 1967, Ser. No. 687,032
Claims priority, application France, Dec. 28, 1966, 89,135
Int. Cl. G01r 33/02
U.S. Cl. 324—43      8 Claims

ABSTRACT OF THE DISCLOSURE

Magnetometer apparatus for detecting and measuring a magnetic field includes a probe constituted by a saturable magnetic core surrounded by an excitation winding and electrically connected to an exciting A.C. current generator by means of a symmetrical impedance matching circuit constituted by a 4-terminal bridge circuit which serves to cyclically gate a source of D.C. current connected across two non-adjacent terminals in series connection with a load resistance. A transformer provided for exciting the probe is connected between the two other non-adjacent terminals and which produces corresponding cyclic changes in the gated current in accordance with the magnitude and direction of the magnetic field actuating the probe and a measuring circuit including integrating circuits and a differential amplifier is connected to the load resistance whereby data are given in response to the magnitude and direction of the magnetic field actuating said probe as a function of the cyclic changes occurring in the gated D.C. current.

---

The present invention relates to apparatus for measuring magnetic fields, using as a sensitive element a saturable core submitted to the influence of the field to be measured and to an auxiliary exciting alternating field.

In the copending application No. 419,520 filed in the United States of America on Dec. 18, 1964, by the applicant (now issued Aug. 5, 1969 as U.S. Pat. 3,460,029), there is disclosed a magnetometer, including a probe constituted by a saturable ferromagnetic core disposed within a single winding, said probe being electrically connected, on the one hand, to an exciting alternating current generator and, on the other hand, to a measuring circuit, said probe winding being connected to said generator through a symmetrical impedance matching circuit having a very low internal impedance whereby the core is cyclically saturated by the exciting alternating current, and supplies at its terminals a differential voltage proportional to the difference between the saturating currents produced in the winding of the probe at each alteration of the excitation current.

The present invention is related to improvements and changes brought to apparatus for measuring a magnetic field of the kind described in the above mentioned patent.

Actually in the known embodiment, the symmetrical impedance matching circuit disposed between the alternating current generator and the exciting winding of the probe uses connections by transformers tuned on the generator frequency.

In some cases, it is desirable to obviate the use of such transformers.

The present invention has for its object to substitute the symmetrical impedance matching circuit described above by a new circuit in which the connections by tuned transformers are eliminated.

According to the inveniton, the symmetrical impedance matching circuit provided between the probe winding and the energizing generator is constituted by a bridge-circuit, fed by a source of D-C current at the terminals of a diagonal in series with a load resistance, while the primary of the probe energizing transformer is connected in the other diagonal, and each arm of the bridge comprises a switch, the switches of two non-adjacent arms being controlled in synchronism by the signals of the generator.

The probe energizing current generator is, preferently, constituted by a multivibrator associated with a bistable multivibrator.

The new embodiment of the impedance matching circuit has, with respect to the embodiment with tuned transformers, some advantages. The frequency of the multivibrator may vary of about ±30% without the magnetometer performance being affected. Actually, the form and the amplitude of the current pulses are not modified and only the time interval between two pulses varies as a function of the frequency. The main advantage of this new circuit is thus to remain unaffected by variations of the frequency of the probe energizing generator. As a result, the circuits of the magnetometer do not require any setting as a function of the energizing frequency.

The magnetic field may be measured in the form of a differential D-C voltage at the output of two intergrating circuits as in the known structure, whereby according to an arrangement already provided this differential voltage after being amplified, gives the negative feed-back current which goes through the circuit constituted by the secondary winding of the energizing transformer and the single winding of the probe and which produces in this winding, the ampere-turns compensating the external magnetic field to which the probe is subjected. The circuit energizing the probe is closed through a capacitor connected at the terminals of said two windings.

The invention will be apparent by reference to the specification and accompanying drawing, given as a non limitative example; in the drawing;

FIG. 1 is a circuit diagram showing a basic embodiment of the invention.

FIG. 2 shows in various points of the circuit curves of the current when there is no external magnetic field.

FIG. 3 shows in the same various points curves of the current when there is an external direct magnetic field.

In the circuit of FIG. 1, a multivibrator 50, the frequency of which is for example 40 kc./s., controls a bistable multivibrator 51 which provides complementary signals S and $\bar{S}$. Reference numeral 52 designates a symmetrical impedance matching circuit comprising four bridged transistors $T_{10}$–$T_{13}$ in which $T_{10}$ and $T_{11}$ are of the same type, NPN for example, while $T_{12}$ and $T_{13}$, both of same type, are of a complementary type PNP in the considered example. The collectors of $T_{10}$ and $T_{11}$, and of $T_{12}$ and $T_{13}$ constitute the terminals of a diagonal of a bridge series connected with a load resistance 53 between a positive voltage source and the ground. The other diagonal, between the emitters of $T_{10}$–$T_{12}$ and $T_{11}$–$T_{13}$ comprises the primary of a transformer 57 for energizing of the probe 60 and a capacitor 58. Two voltage dividers 54 and 55 cause the signals S and $\bar{S}$ to be applied respectively on the bases of $T_{10}$–$T_{12}$ and $T_{11}$–$T_{13}$. Those bases are connected by a capacitor 56 which introduces a time constant on the establishing of the voltage at the input of the impedance matching circuit 52. Reference numeral 59 designates a directional circuit comprising two transistors both of the same type $T_{14}$–$T_{15}$ connected by their emitters to the resistor 53. The bases of transistors $T_{14}$–$T_{15}$ are respectively operated by the signals S and $\bar{S}$, and the collectors of said transistors connected to peak-voltage detecting-integrating circuits 61–62. The output of those circuits are connected to a D-C differential amplifier 63. At the output terminals 66 of said amplifier 63 are connected, on one hand the negative feed-back circuit, comprising the resistor 64, the energizing winding of the probe 60 and the secondary winding of a transformer 57, and on the other hand, the capacitor 65, through which is closed the energizing circuit of the probe.

This device functions according to the following manner: the frequency of the rectangular signals at 40 kc./s. from the multivibrator 50 is divided by two in the bistable multivibrator 51 thus producing two phase-opposed signals S and $\bar{S}$ at 20 kc./s. Said signals S and $\bar{S}$ are applied on the bases of the transistors of the impedance matching circuit 52 which function as switches: for example, if S is a positive wave, it saturates $T_{10}$, blocking $T_{12}$, while simultaneously $\bar{S}$, which is a negative wave, saturates $T_{13}$ and blocks $T_{11}$. The transistors $T_{10}$ and $T_{13}$ are thus made conducting and the current from the positive voltage source goes through the transistor $T_{10}$, the primary winding of the transformer 57, the capacitor 58, the transistor $T_{13}$ and the resistance 53. At the following alternation, $T_{10}$ and $T_{13}$ are blocked, while $T_{11}$ and $T_{12}$ are becoming conducting. The current passes through the following path: $T_{11}$, capacitor 58, primary of the transformer 57, $T_{12}$ and resistance 53. Thus, everything takes place as if $T_{11}$–$T_{12}$ and $T_{10}$–$T_{13}$ were coupled switches worked in synchronism at the tempo of the signals S.

The winding of the probe 60 is thus traversed by a A-C current of energization, transmitted by the secondary of the transformer 57, and the value of this current is regulated so that the saturation of the magnetic core at high permeability of the probe is widely reached. At the moment of saturation, the impedance of the probe becomes very low, practically equal to the ohmic value of its winding then; the current increases in the primary of transformer 57 charging the capacitor 58. At the moment when the capacitor 58 is completely charged, the current in the primary winding of transformer 57, it falls to zero.

In the absence of a superposed direct magnetic field, there are thus collected, in the resistance 53, current pulses like $I_1$–$I_2$, shown in FIG. 2; those pulses are all identical, because of symmetry, for each alternance S of the energizing signal.

If there exists an outside direct magnetic field, the component of this field on the core axis of the probe 60 is added to the alternative ampere-turns for a series of alternance of the energizing current, while it is opposed to those ampere-turns for the other series of alternance. Therefore, the level from which the saturation of the core is reached is no more the same and this dissymmetry provides an inequality of the current-pulses $I_1$ and $I_2$, as shown in FIG. 3. The direction and amplitude of the difference between those currents are, as in the above mentioned patent, function of the polarity and of the intensity of the external superposed magnetic field.

For accomplishing said difference, it is necessary to separate the current pulses $I_1$ and $I_2$ which are all applied on a resistance 53. This is made by way of circuit 59 in which each one of the transistors $T_{14}$ and $T_{15}$ is made alternately conducting and blocked by the signals S and $\bar{S}$ applied on their base.

The signals $I_{61}$ and $I_{62}$, shown on FIGS. 2 and 3, represent the signals applied at the input of the integrating circuits 61 and 62. At their output, the differential direct-voltage $U_1$–$U_2$ is a characteristic of the component of the outside field on the probe axis, as the polarity and the amplitude of this differential voltage depend on the polarity and the amplitude of this component.

This differential voltage may be directly measured, after amplification by amplifier 63, at the output terminals 66 of said amplifier. According to a disposal provided in the above mentioned patent for measuring low fields, it is possible to operate also by negative feed-back: the output voltage from amplifier 63 properly softened by a resistance 64, provides the negative feed-back current to the single winding of the probe 60 which creates the opposing ampere-turns of the superposed external field; the value of the resistance 64 determines the magnetometer sensitiveness, and the voltage drop between the terminals 66 constitutes the output voltage of the magnetometer.

It is to be noticed that it would have been possible not to use the directional circuit 59 of the current $I_1$ and $I_2$ by providing to connect in the respective collector circuits of the transistors $T_{12}$ and $T_{13}$ two distinct resistances of equal value, instead of the single common resistance 53. This solution presents however the drawbacks of demanding a very fine balancing of those resistances, balancing which risks not to be kept during functioning because of the unequal influence of various parameters, particularly of the temperature, involving a circuit drifting prejudicial to the measuring accuracy.

I claim:
1. Magnetometer apparatus for detecting and measuring a magnetic field comprising a probe, said probe including a saturable ferromagnetic core and an excitation winding thereon, said probe adapted to be positioned in the magnetic field to be measured, a symmetrical impedance matching circuit having a low internal impedance in the form of a four-arm electrical bridge, a source of direct current connected across a first pair of non-adjacent terminals of said bridge in series with a load resistance, a transformer for exciting said probe winding, the primary winding of said transformer being connected across the other pair of nonadjacent terminals of said bridge, said probe winding being connected across the secondary of said transformer, each of the four arms of said bridge including a switch, an alternating current generator for producing alternating control signal voltages of opposite phase, means controlling said switches by the signal voltages produced by said generator to produce a gating of said direct current alternately in opposite directions through said primary winding of said transformer but in the same direction through said load resistance whereby the core of said probe is cyclically saturated by the successive current flows of opposite direction, and a measuring circuit connected to said load resistance for measuring the difference in the successive gating currents which arise as a result of the difference between the saturating currents produced respectively in said probe winding for each alternation of said control signal voltage in dependence upon the magnitude and direction of the magnetic field to which said probe is exposed.

2. Detecting and measuring apparatus as defined in claim 1 wherein said alternating current generator for producing said control signal voltages of opposite phase is constituted by a multivibrator connected to a bistable multivibrator.

3. Detecting and measuring apparatus as defined in claim 1 wherein said switches are constituted by transistors, the transistors connected into certain of the non-adjacent bridge arms being of a complementary type.

4. Detecting and measuring apparatus as defined in claim 1 wherein a multivibrator connected to a bistable multivibrator is provided as said generator to supply said control voltage signals in phase opposition, wherein said switches are constituted by transistors, and circuit means applying said phase opposed voltage signals to the bases of said transistors, said signal voltage of one phase being applied to a first transistor of one type in a first bridge arm and simultaneously to a second transistor of the complementary type in an adjacent second bridge arm, and said signal voltage of the opposite phase being applied to a third transistor of one type in a third bridge arm and simultaneously to a fourth transistor of the complementary type in an adjacent fourth bridge arm thereby to effect the successive current flows of opposite direction respectively through said primary winding of said transformer.

5. Detecting and measuring apparatus as defined in claim 1 and which further includes a capacitor connected in series with said primary winding of said probe excitation transformer.

6. Detecting and measuring apparatus as defined in claim 1 wherein a multivibrator connected to a bistable multivibrator is provided as said generator to supply signal voltages in phase opposition and wherein said measuring circuit includes a pair of detecting and peak voltage integrating circuits connected to said load resistance through two switches, said switches being controlled respectively by said signals supplied from said bistable multivibrator.

7. Detecting and measuring apparatus as defined in claim 6 wherein said switches which connect said integrating circuits to said load resistance are constituted by transistors of the same type.

8. Detecting and measuring apparatus as defined in claim 6 and which further includes a differential direct current amplifier connected to the output of said integrating circuits, and circuit means connecting said probe winding to the output of said differential amplifier to establish a direct current feedback current traversing said probe winding and secondary of said transformer, the output of said differential amplifier serving as a measurement of said magnetic field.

References Cited

UNITED STATES PATENTS 2,752,564  10/1955  Ryerson _____ 324—43

FOREIGN PATENTS 150,919      1962     Russia.
1,087,980  10/1967  Great Britain.

RUDOLPH V. ROLINEC, Primary Examiner

R. J. CORCORAN, Assistant Examiner